US005437898A

United States Patent [19]

Forry et al.

[11] Patent Number: 5,437,898

[45] Date of Patent: Aug. 1, 1995

[54] CERAMIC VENEER COMPOSITE STRUCTURE

[75] Inventors: John S. Forry, Lancaster; Thomas C. Simonton, Willow Street; William C. Welch; Jerome D. Wisnosky, both of Lancaster, all of Pa.

[73] Assignee: Armstrong World Industries, Inc., Lancaster, Pa.

[21] Appl. No.: 327,698

[22] Filed: Oct. 24, 1994

Related U.S. Application Data

[62] Division of Ser. No. 878,554, May 5, 1992.

[51] Int. Cl.[6] .......... B32B 7/00

[52] U.S. Cl. .......... 428/34.4; 428/33; 428/34.5; 428/34.6; 428/143; 428/156; 428/210; 428/409; 428/904.4

[58] Field of Search .......... 428/33, 34.4, 34.5, 428/34.6, 143, 156, 210, 409, 904.4

[56] References Cited

U.S. PATENT DOCUMENTS 4,207,371 6/1980 Otto .......... 428/212

*Primary Examiner*—Patrick J. Ryan
*Assistant Examiner*—Rich Weinberger

[57] ABSTRACT

A print and fusion process is used to fabricate ceramic elements that are subsequently utilized to generate a composite including a fibrous mat and discrete ceramic elements. The composite may include a substrate and a flexible or rigid non-ceramic composition between the discrete ceramic elements and/or the substrate. A ceramic ink preferably partially penetrates the fibrous mat to form the discrete elements or a continuous layer.

4 Claims, 1 Drawing Sheet

CERAMIC VENEER COMPOSITE STRUCTURE

CROSS-REFERENCE TO RELATED APPLICATION

This is a divisional application of Ser. No. 07/878,554 abandoned.

FIELD OF THE INVENTION

This invention relates to a composite structure including a fibrous mat and a plurality of discrete ceramic elements or islands, a method for making such a composite structure, a screen useful in printing the discrete ceramic elements, and procedures to install (adhere, seam seal and field cut) and remove the same. The invention also relates to a composite structure in which a ceramic composition, preferably penetrates only a portion of the fibrous mat.

BACKGROUND OF THE INVENTION

Most ceramic architectural products are presently made from thick bodies which are fused at high temperatures. They impart wear/stain resistance through their inherent hardness, low porosity and chemical inertness. When properly installed, they exhibit long life and appearance retention. While existing for centuries, no substantial advancements have been made in the processes to either manufacture or install ceramic products. The manufacturing process involves high temperatures and relatively long fusion times; grouting often involves traditional cement or more recently rigid epoxy/cement systems. Substantial thickness has been required due to the brittleness and fragility of the ceramic. These products and their installed weight require special preparation of the substructure on which the ceramic product is installed both for on-grade and above-grade installations. To install current ceramic products, the support structure must be very flat. Removal of these products is tedious and difficult.

SUMMARY OF THE INVENTION

An object of the present invention is to provide a composite structure which has the appearance retention and wear resistance of ceramic while reducing the overall weight of the structure and permit easy installation without the necessity of preparing a very flat, strong, dimensionally stable substructure.

The present inventors have produced product structures that combine the best characteristics of ceramic and resilient products. Through judicious selection of components, a structure has been fabricated that combines relatively thin ceramic elements, a fibrous mat, a non-ceramic composition between and/or below the ceramic elements as appropriate, and flexible, conformable or rigid support substrates.

The ceramic elements have a thickness of about 5 to about 100 mils, preferably about 15 to about 75 mils, and more preferably about 20 to about 50 mils. The shape of the ceramic elements includes geometric and random, and may be of differing sizes. However, the maximum dimension of the discrete elements is preferably $1\frac{1}{2}$ inches, and more preferably less than 1 inch, and most preferably less than one-half inch. Further, the aspect ratio (the length divided by the thickness) should be at least 3.

Prior art ceramic elements as thin as one-eighth inch (125 mils) are known. However, thinner elements have proven to be too brittle. By use of the fibrous mat and non-ceramic composition, this disadvantage of the prior art has been overcome.

The fibrous mat may be woven or non-woven, but is preferably non-woven. In the preferred embodiment, the fibrous mat should have substantial thickness since the ceramic ink only partially penetrates into the fibrous mat, leaving the portion of the mat opposite the ceramic ink free of ceramic ink. The preferred thickness of the fibrous mat is from about 10 to about 30 mils, mere preferably about 12 to about 20 mils. However, fibrous mats of lesser and greater thicknesses can be used.

The substantial thickness of the fibrous mat improves. adhesion of the ceramic elements to the non-ceramic composition and/or substrate. Since the ceramic ink penetrates into the fibrous mat, it adheres well to the mat. It is easier to adhere the ceramic-free fibrous mat to the non-ceramic composition and/or substrate than to directly adhere the ceramic elements to the non-ceramic composition and/or substrate, particularly if the non-ceramic composition and/or substrate is not rigid. The fibers mechanically bond the ceramic and non-ceramic composition. Also, since the ceramic ink does not penetrate to the continuous belt or other support structure during manufacture, the ink will not fuse to the belt and it is not necessary to prevent such fusion.

Further, the shape of the ceramic elements is controlled by the fibrous mat. During the fusion step, without the fiber, the ceramic ink would soften, and tend to flow and lose its desired shape. However, the fibrous mat helps the softened droplet retain its shape above the surface of the mat as well as within the mat.

In fact by controlling the penetration of the ceramic ink into the fibrous mat so that there is only partial penetration, a composite comprising a continuous layer of ceramic can be formed. The fibrous mat may reduce the brittleness of the ceramic and enhances adhesion of the composite to a non-ceramic composition and/or substrate.

The properties of the composite are influenced by the type of material selected for the fibrous mat. Glass scrim is preferred. However, inorganic scrims, stainless steel fabric, organic/inorganic mixed scrims, and totally organic scrims have been used.

Technology key to the fabrication of these hybrid ceramic organic structures involves a capability to generate thin ceramic layers and/or ceramic elements of controlled size, shape and pattern, preferably in a fast fire process. Typical fabrication steps include embedding the ceramic elements in a matrix and lamination of the composite to a resilient substrate.

A fibrous woven or non-woven carrier is selected based on its capacity to retain thick ceramic deposits in preselected regions via printing or stenciling processes. The fibrous mat may be printed with a ceramic ink using a screen that has "wells" defined beneath the open areas that permit a "thick" deposit of ink, or the ceramic ink may be applied by a rotary screen printing process. The pattern's design is such that the ceramic regimes may form isolated "islands" of relatively small size in relation to the overall dimension of the product.

The volatile components are removed, and the entire sheet is processed through a burnout and fusion furnace. The fused sheet is transferred to a layer of a non-ceramic composition to saturate the fibrous mat or web. Then appropriate cure and/or thermal treatment is done to solidify and develop the properties of the non-ceramic composition, which is preferably a polymer grout.

If the fibrous mat is saturated from the bottom up (from the surface opposite the ceramic elements), the exposed surface of the ceramic elements do not need to be cleaned of the non-ceramic composition. However, the non-ceramic composition can be applied to the ceramic element side of the fibrous mat. Further, the non-ceramic composition may be applied as a dry powder which fills the voids between the ceramic elements, while the excess powder can be easily removed by brushing or blasts of air.

The non-ceramic composition is preferably a polymer composition such as plastisol, urethane, polyester, epoxy, silicone, or phosphate cement. The non-ceramic composition may be a ceramic filler with a polymer binder.

The result is a sheet consisting of a polymeric matrix surrounding relatively small regimes of ceramic; hence, ceramic veneer islands. The ceramic veneer island (CVI) sheet is laminated to a suitable substrate using common adhesives. The liquid polymer may be applied directly to the substrate so that it also serves as a bonding agent.

The incorporation of ceramic components in the composite structure provides ceramic-like wear performance behavior while the grout system imparts flexibility and/or resilience to the composite. The composite structure is capable of passing the Mandrel Bend Test Method of ASTM D3111, being bent around a six inch mandrel. Preferably the composite structure can be bent around a two inch mandrel, and more preferably a one inch mandrel. Also if the composite were laid on a ledge with one end overhanging the edge, it may droop at least one-half inch over a foot distance.

While the above tests measure flexibility which is an important property for ease of installation, it is important that the surface covering which includes the composite structure be able to conform to the subfloor or substructure on which it is laid. Reducing the amount of ceramic material in the composite layer is one way to improve conformability. Ceramics are not flexible or conformable. The thickness of the prior art ceramic makes it difficult to form a surface covering which is conformable and/or flexible.

Further, the thinness of the elements permits the construction of a composite which supports the ceramic elements and is conformable and/or flexible. In fact the composite can be laid on the subfloor or substructure without being adhered to a substrate or a surface covering can be formed in which the volume defined by the exposed surface of the ceramic elements to a depth of $\frac{1}{4}$ inch comprises no more than 50 percent of the ceramic elements, and preferably no more than 33 percent.

To deposit the ceramic elements, present printing technology is modified to deposit thick ceramic compositions. To accomplish the controlled print deposition, the fabrication of print screens with special thick polymer layers is required to print apply the ceramic compositions onto or into the fibrous mats that support the deposited layers during drying and fusion processing.

Subsequent lamination of the composite CVI matrix to a substrate which further supports the ceramic elements permits the formation of a tile component with flexibility and conformability of typical resilient tile. This simplifies installation and increases the ease of removal when compared to prior art ceramic tile. Alternatively, the ceramic elements and fibrous mat can be laminated onto substrate which has been covered with a non-ceramic composition such as plastisol or an adhesive.

The substrate may be a rigid tile or a conventional tile base. If a rigid substrate is used, a conformable rubber layer may be disposed opposite the composite layer so that the structure can conform to the surface of the support structure on which the surface covering is laid.

The surface covering or tile may be formed by printing different colored discrete ceramic elements or the individual elements printed with different colored ceramic slurries or inks to form a desired non-random pattern, which pattern may be repeating. The pattern may be formed by the various colors of the discrete elements or by the location of the elements themselves. Further, the non-ceramic composition or grout which is disposed between the discrete elements may be multicolored to form a multi-colored pattern.

The grout and/or discrete elements may be transparent or translucent. If such discrete elements and grout is disposed over a printed substrate a desired pattern may be obtained. Preferably, a multi-colored plastisol is disposed on a substrate and the discrete elements and fiber mat are laid over the plastisol so that the plastisol penetrates into the fibrous mat from the surface of the mat opposite the ceramic elements.

Fast-fire fusion of the ceramic components, visual presentation from ceramic/grout combinations and design-control in the ceramic components are interwoven in this invention along with substrate selection to enhance performance and installation.

Typical quarry tile might be fired one to three days and presently known fast fire ceramics require one hour of firing. Because of the thinness of the ceramic elements of the present invention, the composite of ceramic ink and fibrous mat may be fired in about 3 to 12 minutes.

DETAILED DESCRIPTION OF THE INVENTION

Figure 1:
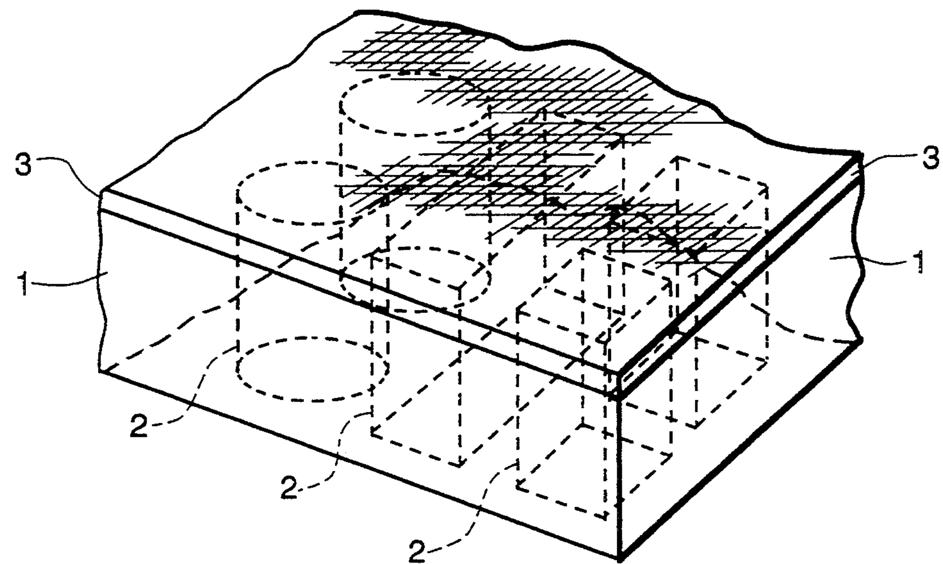
FIG. 1 is a schematic representation of the emulsion screen of the present invention.
Figure 2:
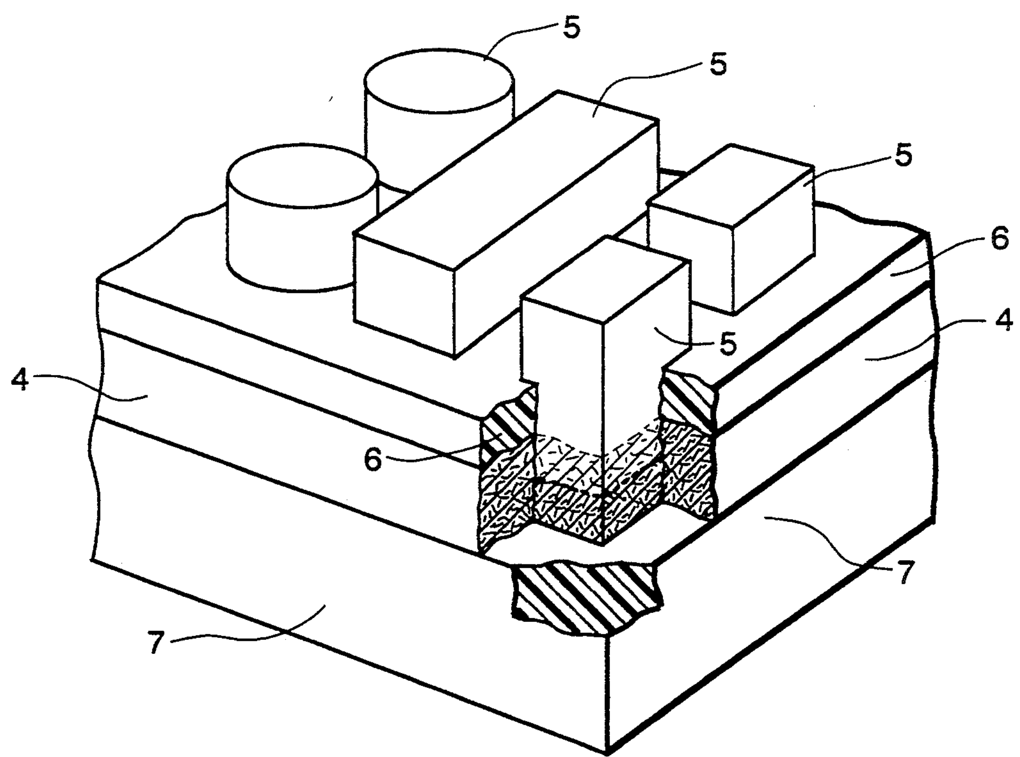
FIG. 2 is a schematic representation of the composite layer and substrate.

The print screens used prior to the present invention consist of a mesh material stretched taut over a frame with a thin emulsion attached to selected areas. The emulsion acts to direct deposition of inks through selected areas of the screen mesh as well as form a cell thickness which controls the amount of ink deposited. Ordinary emulsion thicknesses range from 1 to 2 mils up to about 5 mils.

In the present invention, modified screens were used to control ceramic slurry or ink deposition thickness. The modified screens consist of a plastic sheet 1 that contains preformed passage ways 2. The plastic sheets are glued to a screen mesh 3. The thickness of the plastic sheet and the image formed by selecting passageway locations control the thickness of the deposited ink and the area over which the ink is deposited, and therefore, the penetration into the fibrous mat.

Use of a fibrous mat as the material upon which ink is deposited serves to direct and restrict ink movement during penetration and subsequent drying/fusion steps. The deposited ceramic ink penetrates the fibrous matrix of the mat 4 and is supported as individual elements 5.

The fibrous network also plays a role in manufacturing a desirable ceramic element configuration, especially to minimize rupturing or fissuring of the ceramic prior to or during fusion.

The composite ceramic veneer island structure includes a grout 6 surrounding the distinct ceramic elements 5. The ceramic elements are about 40 mils thick and are of controlled shape and size. Fabrication procedures involve printing onto a fibrous mat (use of special print screens), handling during fusion and flooding a liquid or powder to grout the fused ceramic elements. The composite may be laminated to a substrate 7.

EXAMPLE 1

A non-woven fiberglass scrim, designated AGF, was purchased from the Manville Corporation. The fibrous mat was approximately 15 mils thick with one smooth side suitable for achieving high quality printing. The fibrous mat was lightly attached to a thin aluminum plate with 3M spray adhesive #75. The aluminum plate created a nonporous surface capable of being held down by vacuum. The scrim/aluminum plate assembly was placed onto the bed of a conventional print table and the vacuum turned on.

Special screens were fabricated to deposit thin ceramic ink layers. A 31.5 mil thick Acetal sheet purchased from Ain Plastics of Lancaster, Pa., was covered on one side with three layers of 5 mil adhesive film from 3M company. The adhesive film had the release carrier still attached to the outside of the last layer. This adhesive covered Acetal sheet was converted into a stencil with a 14"×14" pattern consisting of $\frac{3}{8}$" squares on 7/16" centers by laser cutting. A 25 mesh polyester silk screen fabric was stretched over a nominal 30×40" frame. The laser cut stencil was then bonded to the silk screen fabric through the removal of the release carrier covering and using Epoxy 2216 from the 3M Company around the perimeter.

The screen was mounted onto the print station and loaded with ink. The inks were either solvent or water-based systems. The viscosity of a water reducible ceramic ink was adjusted to 40,000 centipoise by the addition of conventional glycol based polymer medium. A conventional rubber squeegee was used to execute a flood stroke followed by a print stroke with a squeegee in a nearly vertical position. The off-contact distance was approximately one quarter of an inch. The ceramic slurry did not completely penetrate the fiberglass scrim.

The printed fibrous mat still attached to the aluminum plate was loaded into a conventional convection air oven heated to approximately 200° F. After approximately 15 minutes of drying, the printed fibrous mat was stripped from the aluminum plate and returned to the oven for another hour of drying. The dried printed fibrous mat was placed onto a Cordierite setter approximately 15"×15" by $\frac{3}{4}$" thick.

The setter and fibrous mat assembly was processed through the Radiant Technology Corporation (RTC) furnace at 5" per minute. The four heating zones, 10", 20", 20" and 10" in length were set to 350° C., 500° C., 650° C. and 775° C., respectively to provide a desirable burnout and ramp up to the fusion temperature.

A conventional PVC plastisol was prepared and reduced to a viscosity in the region of 4,000 centipoise. The plastisol was drawn down onto a release surface, specifically a release coated flooring felt with a 40 mil drawn down bar. The fused ceramic fiberglass sheet was slid onto a Teflon coated cookie sheet in a careful manner so as not to disrupt what has become a rather mechanically fragile sheet. The sheet was then lowered into the plastisol by sliding the sheet off one edge of the cookie sheet.

Two minutes were allowed to elapse to permit uniform and adequate saturation of the plastisol into the fibrous network around the fused ceramic squares. The entire assembly, fused sheet, plastisol, and release felt was placed into an oven treated to 385° F. for 2 minutes. Upon removal, the assembly was placed onto a flat surface and allowed to cool. The sheet of fused plastisol/ceramic squares was stripped off the release felt and cut to final size. An overall resilient structure with regimes of hard inflexible ceramic was produced.

EXAMPLE 2

Sheets as prepared in Example 1 were laminated to a variety of substrates. Among these were limestone filled, plasticized PVC ranging in thickness from 40–125 mils; gypsum board; plywood; and $\frac{1}{4}$" aluminum plate. Adhesives used were either a pressure-sensitive one commonly used for the installation of "peel and stick" floor tiles or 3M 2216, a flexible epoxy.

The lamination step was unnecessary when a non-release flooring felt was used on which to draw down the PVC plastisol. The felt remained as part of the final product upon removal from the plastisol fusion oven.

EXAMPLE 3

Multi-colored samples were produced by two methods to generate either through color or surface color decoration of the ceramic islands. Method 1 involved forming a multicolor array of through-color elements by printing different colored islands in selected areas; Method 2 involved over printing of selected elements from Example 1 with different single colors.

In Method 1, three full pattern deep-well screens were mounted, and each of the screens was coated with silk screen emulsion in such a way that the cells not to be printed by the color from that particular screen were blocked off. The screens were then used in order with careful registration such that the closed cells of the second and third printing accommodate the ink deposited by the previous printing or printings. Drying was carried out after each color was printed as described in Example 1. The subsequent processing steps were the same as those described in Example 1.

In Method 2, the overprint method, a full single through-color pattern was printed with a first screen. Then three additional standard silk screens using 60 mesh fabric, each with an open pattern corresponding to the islands that were to be printed with the desired color were used in turn to overprint the dried ceramic ink deposited with the first screen. A drying step was again executed between each color print as described in Example 1. The subsequent processing steps were the same as those described in Example 1. An attractive four colored image in registration was produced.

EXAMPLE 4

The final fused surface characteristics of the ceramic elements were modified by adding 200 mesh alumina at approximately a 30% level to a ceramic overprint ink or sprinkling a dusting of alumina over the top of the just-printed undried sample, and then firing the ink or alumina. Samples with coefficient of frictions ranging from 0.4 to 1.1 were produced in this manner. By applying the alumina to the surface, rather than adding it to the printed ceramic islands, less alumina is used.

EXAMPLE 5

The PVC plastisol used in Example 1 was substituted with a variety of liquid polymers such as UV curable urethane (clear), polyester, molding urethane, epoxy and silicone. The procedures of Example 1 were followed and produce satisfactory composites.

EXAMPLE 6

Powdered polymers were used to fill the regions between the ceramic elements. When the powdered polymers were applied to the liquid polymer already in place surrounding the ceramic islands and the liquid polymer heat cured such that the powder was not completely melted, a granular effect was produced in the grout. Therefore, powder controlled the topological features, mainly texture, in the region between the discrete ceramic elements. PVC, polyester, urethane, epoxy and nylon powders were used either alone or in combination with sticking aids. These materials can be brought into the product from the face by either masking the ceramic elements or removing the excess from the ceramic elements through blowing or brushing.

When used alone, the back surface was free of polymer, leaving the ceramic elements exposed for bonding with a lamination adhesive. Alternatively, a powder layer was formed, and the fused sheet as discussed in Example 1 was laid into the powder. Fusion of each polymer was accomplished in an oven using time and temperature appropriate for each polymer.

EXAMPLE 7

The discrete ceramic elements may be of various shapes and sizes. Designs incorporating 3/16" and ⅜" squares, a mixture of various size squares, random irregular shapes, and a combination of squares and rectangles were used. The size and shape of the islands are not limiting.

EXAMPLE 8

Samples were made where the non-woven glass fibrous mat used in Example 1 was substituted with woven fabrics, inorganic scrims, and stainless steel fabric. Also used were organic/inorganic mixed scrims, and totally organic fibrous mat (cellulose). Each produced satisfactory composites.

EXAMPLE 9

A layer of natural rubber approximately 20 mils thick was placed to the back of the composite samples employing the filled PVC substrate to provide increased conformability.

EXAMPLE 10

Rigid tile were produced by using a high modulus epoxy material surrounding the ceramic elements. Alternatively, a sample as prepared in Example 1 was laminated to a conventional tile base with high modulus epoxy.

EXAMPLE 11

Ease of installation/removal was achieved by using a conventional pressure sensitive adhesive which was tacky at room temperature or two-faced tape. Samples installed via two-faced tape survived severe trafficking and stair-tread environments. Removal was similar to resilient flooring systems. Epoxy adhesives similar to grout systems are acceptable.

EXAMPLE 12

A larger structure was made by seam joining individual CVI composite structures using silicone or epoxy. Rotary screen printing also extended the length and width of the ceramic element array, which when grouted, generated large area CVI composites.

EXAMPLE 13

Scrims composed of high temperature fibers were used as the substrate for the ceramic ink. Ceramic slurry 30 to 45 mils thick was printed onto Nextel-fiber fibrous mat and fused at 750° C. as described in Example 1. Break strength was increased to 6,400 PSI for the Nextel scrim/ceramic element composite compared to 2,500 PSI for the composites described in Example 1.

EXAMPLE 14

A transparent material was used to grout the ceramic veneer elements to produce 3-D effects and/or permit visualization of the substrate beneath the grout. One sample was made using a transparent PVC plastisol incorporating metallic flakes. Other samples were made with a transparent PVC (fused with heat) and a urethane acrylate (cured with UV radiation) atop a substrate with color or decorative backgrounds. Perception of depth results in the grout regions.

EXAMPLE 15

Cementitious grouts were substituted for the polymeric grouts of Examples 1 and 5.

EXAMPLE 16

Ceramic elements described in Example 1 were made using stencils without screens. Stencils were made from plastic or metal sheets 30 to 45 mils thick.

EXAMPLE 17

Samples were made as in Example 4 and the profile of the fused ceramic elements modified by rolling the partially dried ceramic slurry to level the upper surface of the ceramic islands. In this manner, the slightly concave upper surface of the ceramic islands were flattened,

EXAMPLE 18

Samples were made as per Example 1 and the fused ceramic elements laid into a continuous grout. A wide/-long CVI composite structure was formed from these smaller CVI element structures.

EXAMPLE 19

A CVI sheet was prepared as in Example 1 except that the fused ceramic elements with the fibrous mat was saturated upside down in the PVC plastisol. The perpendicular pull out force was measured for this product and the Example 1 product. The results showed that only a nominal force of 0.1 to 0.2 lbs. was required to extract one ceramic chip from the Example 19 product, whereas an average force of 4.0 lbs. was required to remove a chip from the Example 1 product. Therefore, the presence of a fibrous mat enhanced adhesion of the plastisol to the ceramic elements without chemical bonding.

What is claimed is:

1. A composite layer comprising a fibrous mat and a ceramic composition, the ceramic composition forming a plurality of discrete elements which penetrate into the fibrous mat, a portion of the fibrous mat being embedded in a portion of each of the discrete elements and a portion of the fibrous mat between adjacent discrete elements being free of the ceramic composition.

2. The composite of claim 1 wherein the fibrous mat is non-woven.

3. A composite layer comprising a fibrous mat and a ceramic composition, the ceramic composition penetrating only a portion of the mat whereby a portion of the mat adjacent the surface of the mat opposite the ceramic composition are free of the ceramic composition.

4. The composite layer of claim 1 wherein the plurality of discrete ceramic elements are about 5 to about 100 mils thick and form a non-random pattern, the elements having an aspect ratio of at least 3.

* * * * *

UNITED STATES PATENT AND TRADEMARK OFFICE
CERTIFICATE OF CORRECTION

PATENT NO. : 5,437,898

DATED : August 1, 1995

INVENTOR(S) : John S. Forry et al

It is certified that error appears in the above-identified patent and that said Letters Patent is hereby corrected as shown below:

In column 1, line 7, the word "abandoned" should be deleted and replaced with --now U.S. Patent No. 5,411,791--.

In column 2, line 9, the word "mere" should read --more--.

Signed and Sealed this

Seventh Day of November, 1995

Attest:

BRUCE LEHMAN

Attesting Officer

Commissioner of Patents and Trademarks